No. 606,904. Patented July 5, 1898.
W. E. TUBBS.
PAN HANDLE.
(Application filed Nov. 6, 1896. Renewed Jan. 19, 1898.)

(No Model.)

WITNESSES
Max Abel
L. W. Stockbridge

INVENTOR,
Watson E. Tubbs.
By John Wedderburn
Attorney

THE NORRIS PETERS CO., PHOTO-LITHO., WASHINGTON, D. C.

UNITED STATES PATENT OFFICE.

WATSON E. TUBBS, OF SOUTH HAVEN, MICHIGAN.

PAN-HANDLE.

SPECIFICATION forming part of Letters Patent No. 606,904, dated July 5, 1898.

Application filed November 6, 1896. Renewed January 19, 1898. Serial No. 667,177. (No model.)

*To all whom it may concern:*

Be it known that I, WATSON E. TUBBS, a citizen of the United States, residing at South Haven, in the county of Van Buren and State of Michigan, have invented certain new and useful Improvements in Pan-Handles; and I do hereby declare the following to be a full, clear, and exact description of the invention, such as will enable others skilled in the art to which it appertains to make and use the same.

This invention has reference to a novel construction in a removable handle for saucepans and the like; and it consists in the features of construction hereinafter fully described and claimed.

Figure 1:
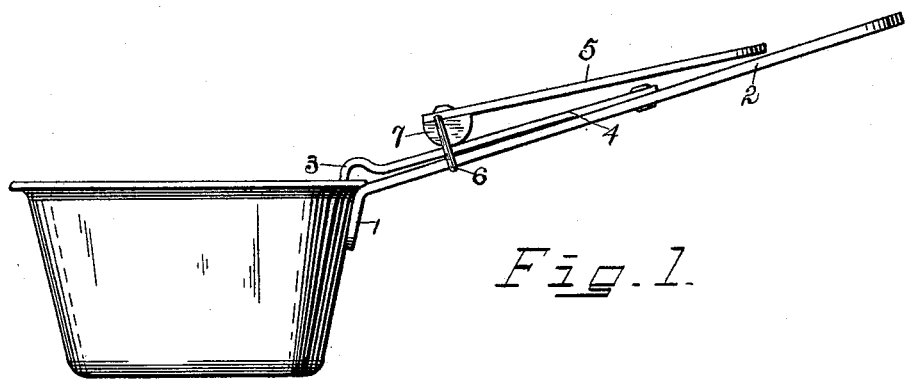
Figure 2:
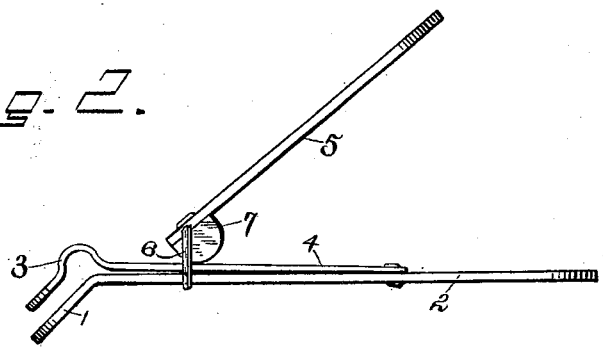

In the accompanying drawings, forming a part of this specification, Figure 1 is a side elevation of this improvement applied to a saucepan. Fig. 2 is a side elevation of said handle with the jaws opened.

Referring now to said drawings, 1 indicates the lower jaw, provided with a handle 2, and 3 the upper jaw, having a spring-stem 4, rigidly secured to the handle 2 of the lower jaw. The jaws 1 and 3 stand at an angle to the handle and stem, while the said spring-stem serves to hold the jaws normally opened. To close the jaws, an operating-handle 5 is employed, that is pivoted to a bail 6, secured to the lower handle 2. The said operating-handle 5 is provided on its lower face and adjacent its pivot with a cam 7, engaging the upper face of the spring-stem 4 and serving to close the jaws when the operating-handle is brought down close to the handle 2 of the lower jaw.

In this way it will be seen that the side of the pan or like article can be firmly grasped between the jaws of this device by simply pressing the handles together and can be carried safely, since the handles are kept close together by the end which serves to lift the pan.

The device is simple and inexpensive and provides a convenient adjunct in the kitchen.

Having thus described my invention, what I claim as new, and desire to secure by Letters Patent, is—

1. A device of the kind specified consisting of a jaw and handle, a spring-stem secured to said handle, and having a jaw at its free end and an operating-handle pivoted to said first-mentioned jaw and provided with a cam engaging said spring-stem, substantially as described.

2. A device of the kind specified consisting of a lower jaw and handle, a spring-stem rigidly secured to said handle, and having a jaw at its free end, an upwardly-extending bail upon said handle, and an operating-handle pivoted to said bail and provided with a cam engaging the upper face of said spring-stem, substantially as described.

In testimony whereof I have signed this specification in the presence of two subscribing witnesses.

WATSON E. TUBBS.

Witnesses:
GEO. B. BEEBE,
CHAS. L. RUMSEY.